2,836,026

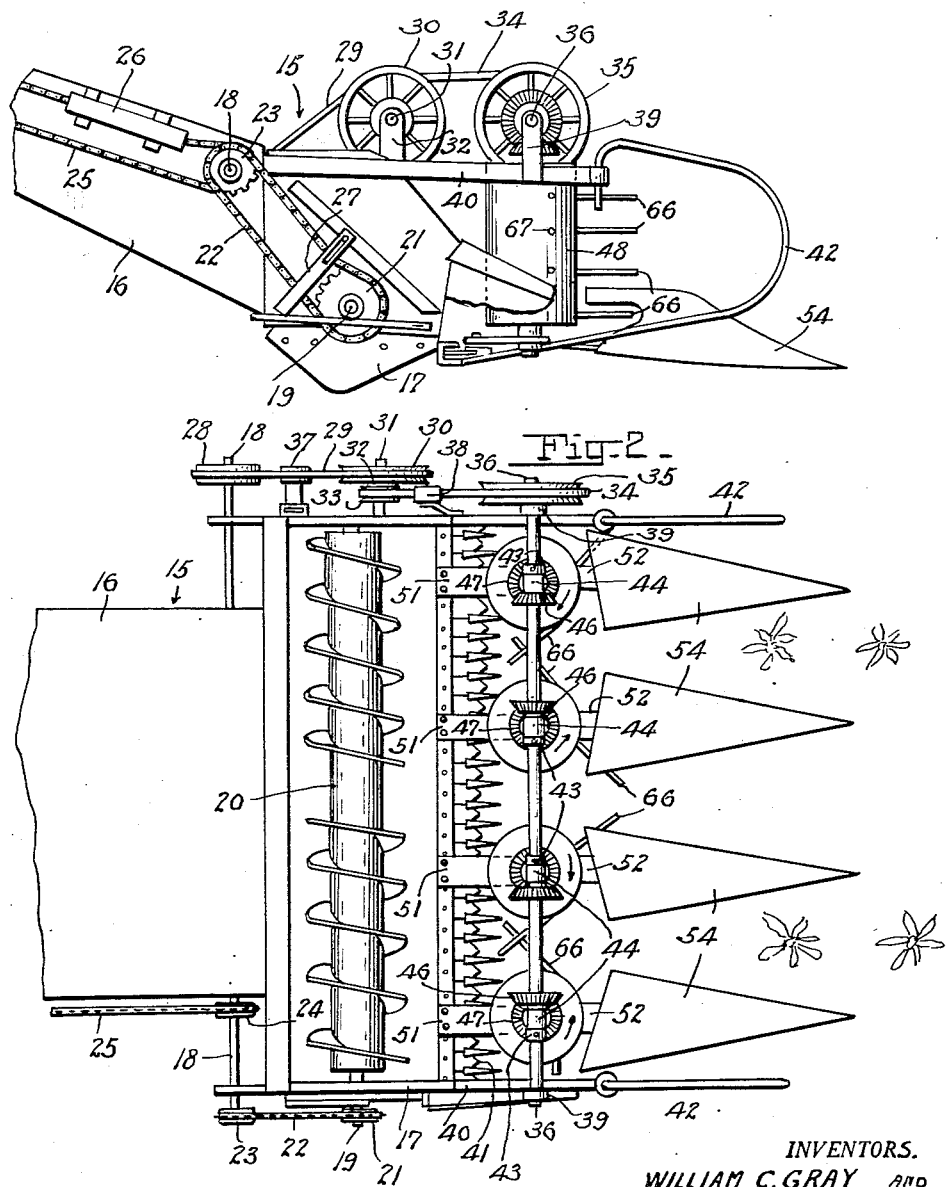

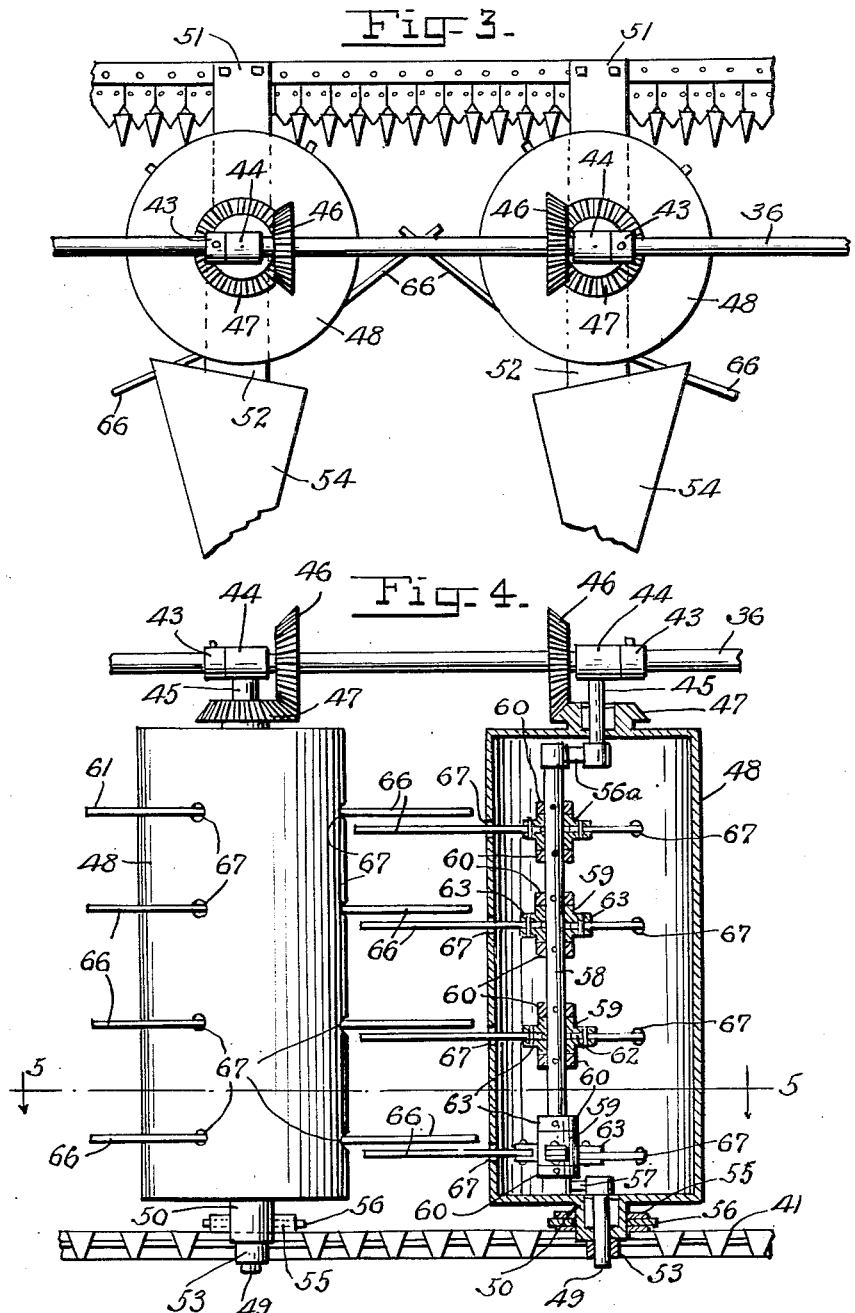

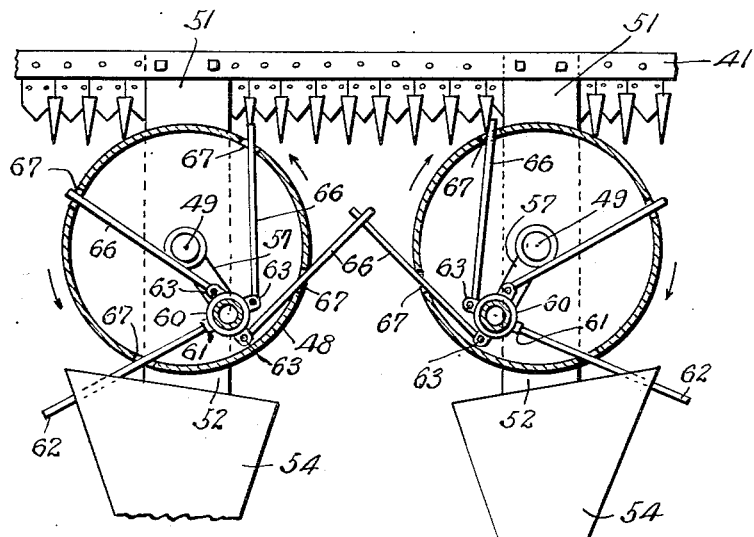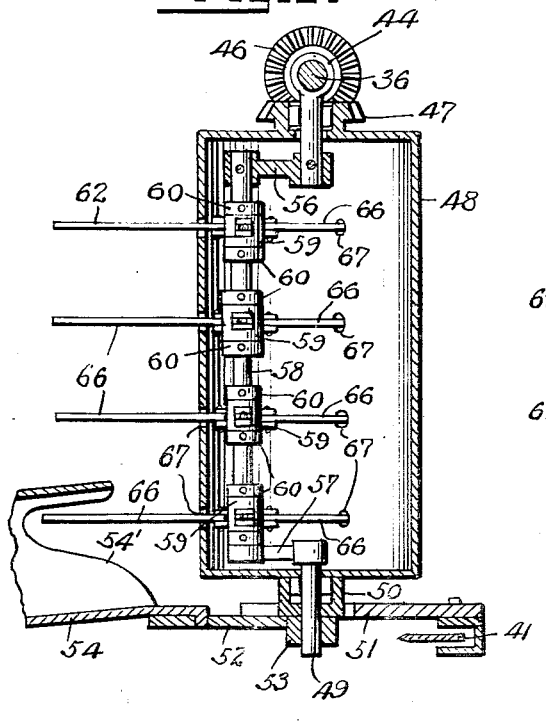

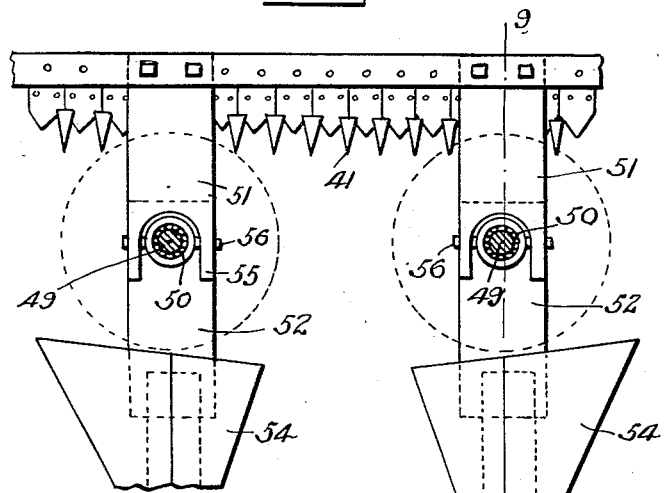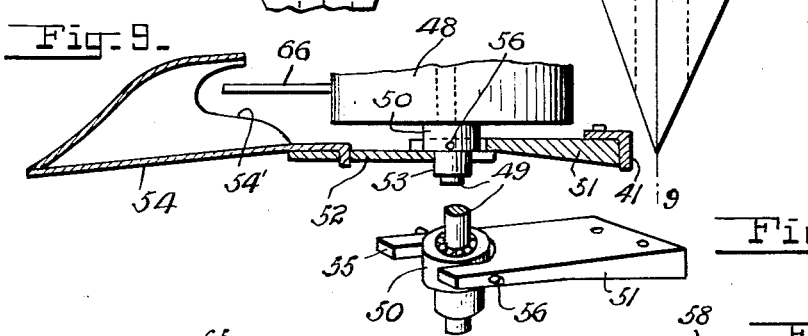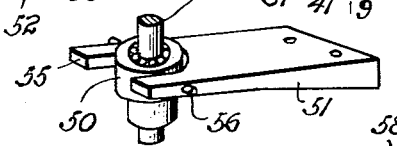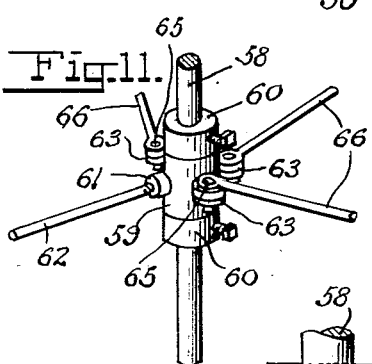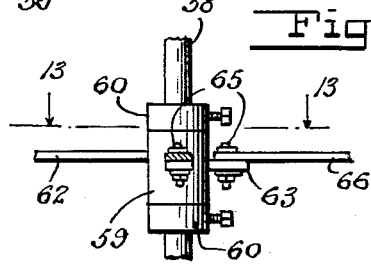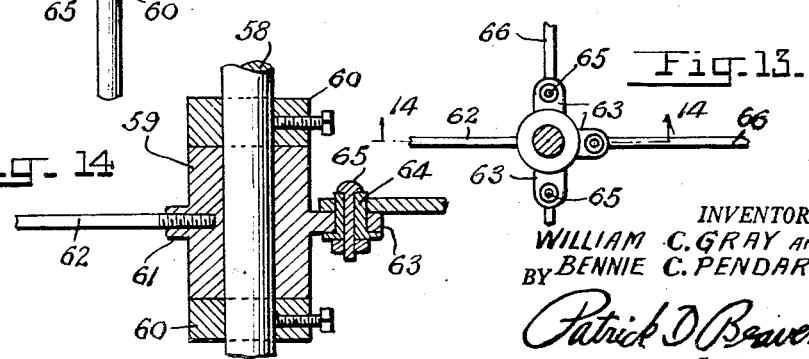

VERTICAL CYLINDER ATTACHMENT FOR COMBINES

William C. Gray and Bennie C. Pendarvis, Allendale, S. C.

Application October 14, 1955, Serial No. 540,505

1 Claim. (Cl. 56—119)

This invention relates to a vertical cylinder attachment that is adapted to replace the conventional reel of a row crop combine.

An object of the invention is to provide an attachment of this type that can be used in row crop combining of corn, soybeans, sorghum, peas and like crops.

The usual combine at the present time cannot satisfactorily harvest row crops due to the horizontal disposition of the reel and some provision has to be made so that the harvesting mechanism could pass between the rows and efficiently harvest the row crops such as outlined above. The attachment embodying the invention has been found to be very efficient in harvesting row crops and has also been found to be simple and inexpensive to manufacture.

With the above and other objects and advantages in view the invention consists of the novel details of construction, arrangement and combination of parts more fully hereinafter described, claimed and illustrated in the accompanying drawings in which:

Fig. 1 is a side elevational view, partly broken away, of a portion of a combine with the attachment embodying the invention in attached operational relation thereto;

Fig. 2 is a top plan view of the assembly of Fig. 1;

Fig. 3 is a top plan view, partly broken away, of two of the vertical cylinders of the attachment;

Fig. 4 is a front view, partly in elevation and partly in section, of the assembly of Fig. 3;

Fig. 5 is a transverse sectional view on the line 5—5 of Fig. 4;

Fig. 6 is an enlarged vertical sectional view, partly broken away, of one of the cylinders of the attachment;

Fig. 7 is an enlarged transverse sectional view of one of the cylinders of the attachment;

Fig. 8 is an enlarged elevational view, partly in section, of the mounting for the cylinders with the cylinders removed;

Fig. 9 is a sectional view on the line 9—9 of Fig. 8;

Fig. 10 is an enlarged perspective view of one of the mounting brackets for the cylinders;

Fig. 11 is an enlarged perspective view of a mounting for the fingers;

Fig. 12 is a side elevational view, partly in section, of the mounting of Fig. 11;

Fig. 13 is a transverse sectional view on the line 13—13 of Fig. 12; and

Fig. 14 is an enlarged transverse sectional view on the line 14—14 of Fig. 13.

Referring more in detail to the drawings, wherein like parts are designated by like reference numerals, the numeral 15 is used to designate a combine with which the attachment embodying the invention is to be associated.

The combine 15 comprises the elevator 16, side plates 17 in which is journalled a shaft 18 for the elevator 16 and a shaft 19 for the auger 20. A sprocket 21 on the shaft 19 has a chain drive connection 22 with a sprocket 23 on the shaft 18, and a sprocket 24 on the shaft 18 has a chain drive connection 25 with the power plant of the combine, not shown. A chain guide 26 for the chain 25 is mounted on the elevator 16 and a chain tightener 27 for the chain 22 is mounted on the side plate 17.

A pulley 28 on the shaft 18 has a belt drive connection 29 with a pulley 30 mounted on a shaft 31 that is journalled in the bearing bracket 32 and a pulley 33 on the shaft 31 has a belt drive connection 34 with a pulley 35 mounted on a driven shaft 36. A belt tightener 37 engages the belt 29 and a belt tightener 38 engages the belt 34.

The attachment includes the driven shaft 36 which replaces the regular reel shaft of the combine 15, and the shaft 36 is journalled in bearing blocks 39 that are mounted on bars 40 connected to the upper ends of the side plates 17 on each side of the combine 15.

A cutter bar 41 of the combine 15 precedes the auger 20 and grain guides 42 are connected to the ends of the cutter bar 41 and the bars 40.

A plurality of set screw collars 43 are mounted on the shaft 36 in spaced relation to each other and each collar 43 abuts a bearing bracket 44 and each bearing bracket 44 is mounted on a short shaft 45. A bevel gear 46 is mounted on the shaft 36 inwardly of each of the bearing brackets 44 and each gear 46 is fixed to the shaft 36 in this position. The bevel gear 46 meshes with a bevel gear 47 that is fixed to the upper end of a cylinder 48 and is mounted on the short shaft 45. Four cylinders 48 are shown, but more or less may be used, depending on the length of the cutter bar 41.

The opposite end of each cylinder 48 is journalled on a short shaft 49 that is journalled in a bearing block 50 which is mounted in the bifurcated end 55 of a support bar 51 connected to the cutter bar 41. The block 50 is connected to the support bar 51 by a pin 56. Another bar 52 has a bearing 53 for the shaft 49 and a cone-shaped lifter 54 is mounted on each of the bars 51 by welding or other suitable means and each lifter has a cutout 54' therein for a purpose to be later described.

A crank arm 56a is fixed to the lower end of the shaft 45 and a crank arm 57 is fixed to the inner end of the shaft 49. A shaft 58 is connected at its opposite ends to the crank arms 56 and 57, as shown in Figs. 4 and 6.

Four sleeves 59 are mounted on the shaft 58 and a pair of set screw collars 60 abut the opposite ends of each of the sleeves to retain the sleeves in related spaced relation to each other on the shaft 58.

Each of the sleeves has an internally threaded boss 61 to receive a finger rod 62. In radial relation to the boss 61 a plurality of apertured ears 63 are formed integral with each sleeve 59. A bushing 64 is mounted in each of the ears 63 and a bolt and nut 65, mounted in the bushing 64, pivotally connects a finger rod 66 to each of the ears 63. Vertically disposed rows of openings 67 are radially positioned in each of the cylinders 48 to permit the finger rods to be extended outwardly of each of the cylinders 48.

In operation, with the combine travelling over the rows, the power plant of the combine causes the rotation of the shaft 36 in the usual manner. The rotation of the shaft 36 causes the cylinders 48 to be rotated and the rotation of the cylinders 48 causes the finger rods to protrude and recede within the cylinders 48. The lower finger rods pass through the cutouts 54' in the lifter 54 and the finger rods harvest the crops as the combine proceeds. The harvested crops are cut by the cutter bars and fall on the auger and advance up the elevator in the usual manner.

It it believed that from the foregoing description, the operation and construction of the attachment embodying the invention will be clear to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

In an attachment for use in row crop combining of corn and like row crops to be associated with a combine of the type having a transversely disposed, horizontal cutter bar for cutting the crops, a pair of transversely spaced cylinders arranged on parallel vertical axes spaced in advance of the cutter bar, means operatively associated with said cylinders for rotating said cylinders in opposite directions, one of said cylinders having a group of peripheral guide openings spaced uniformly circumferentially about the cylinder and lying in a single plane disposed normal to the axis of the cylinder, a fixed, eccentric vertical shaft in said one cylinder offset forwardly from the cylinder axis and toward the other cylinder, a sleeve rotatably journaled on said eccentric shaft aligned horizontally with said group of guide openings, said sleeve having a harvesting rod rigidly fixed at its inner end to said sleeve and projecting radially therefrom and a plurality of harvesting rods of similar length to said radially projecting rod pivoted at their inner ends to said sleeve at spaced positions about the periphery of said sleeve, said harvesting rods projecting through said guide openings to be guided to various angular positions relative to said shaft by the bounding walls of said guide openings upon rotation of said one cylinder, the length of said harvesting rods being such that the major portions of the harvesting rods are projected from the cylinder during a portion of a cycle of rotation of the cylinder and are withdrawn into the cylinder during another portion of the cycle of rotation thereof.

References Cited in the file of this patent

UNITED STATES PATENTS

| | | |
|---|---|---|
| 1,847,399 | Innes | Mar. 1, 1932 |
| 2,210,219 | Sievers et al. | Aug. 6, 1940 |
| 2,644,292 | Oberholtz et al. | July 7, 1953 |